United States Patent
Benkreira et al.

(10) Patent No.: US 12,236,771 B2
(45) Date of Patent: *Feb. 25, 2025

(54) SYSTEMS AND METHODS FOR CARD-HANDLING BY POINT OF SALE DEVICES

(71) Applicant: Capital One Services, LLC, McLean, VA (US)

(72) Inventors: Abdelkader Benkreira, Washington, DC (US); Joshua Edwards, Philadelphia, PA (US); Michael Mossoba, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,840

(22) Filed: Dec. 6, 2023

(65) Prior Publication Data

US 2024/0242592 A1 Jul. 18, 2024

Related U.S. Application Data

(63) Continuation of application No. 17/993,649, filed on Nov. 23, 2022, now Pat. No. 11,887,463, which is a
(Continued)

(51) Int. Cl.
*G08B 21/24* (2006.01)
*G06Q 20/20* (2012.01)
(Continued)

(52) U.S. Cl.
CPC ........... *G08B 21/24* (2013.01); *G06Q 20/204* (2013.01); *G06V 20/41* (2022.01); *G06V 40/166* (2022.01);
(Continued)

(58) Field of Classification Search
CPC ...... G08B 21/24; G06Q 20/204; G06V 20/41; G06V 40/166; G06V 40/20; G06V 20/44; G07G 1/0009; G07G 1/0036
See application file for complete search history.

(56) References Cited

U.S. PATENT DOCUMENTS

| 4,567,358 A | 1/1986 | Takamatsu et al. |
| 5,049,531 A | 9/1991 | Nakanishi et al. |

(Continued)

FOREIGN PATENT DOCUMENTS

CN 103136861 A * 6/2013

OTHER PUBLICATIONS

Podsada, "The sound is annoying, but chip reader's alert helps prevent consumers from leaving behind credit or debit cards" <https://omaha.com/business/the-sound-is-annoying-but-chip-reader-s-alert-helps-prevent-consumers-from-leaving-behing/article_a7ebbf88-3caf-50cd-a189-58f7fd386fe1.html>. (Year: 2017).

*Primary Examiner* — Nathan A Mitchell
(74) *Attorney, Agent, or Firm* — HUNTON ANDREWS KURTH LLP

(57) ABSTRACT

A computer vision card reader and/or point of sale device is described. The device is configured to sense when a user inserts a card into a card reader and to determine when a user departs or is about to depart from the device without retrieving the card. The device may issue an audible or visible alert to the user, reminding the user to retrieve the card. The device may additionally send a notification to a mobile device associated with the user that reminds the user that he has left a card at the point of sale. In some embodiments, message sent to the user contains a code and, upon entry of the code, the point of sale or card reader device returns the card to the user.

20 Claims, 5 Drawing Sheets

Related U.S. Application Data continuation of application No. 16/743,106, filed on Jan. 15, 2020, now Pat. No. 11,538,326, which is a continuation of application No. 16/394,208, filed on Apr. 25, 2019, now Pat. No. 10,573,163.

(51) Int. Cl.

| | |
|---|---|
| *G06V 20/40* | (2022.01) |
| *G06V 40/16* | (2022.01) |
| *G06V 40/20* | (2022.01) |
| *G07G 1/00* | (2006.01) |

(52) U.S. Cl.
CPC .......... *G06V 40/20* (2022.01); *G07G 1/0009* (2013.01); *G07G 1/0036* (2013.01); *G06V 20/44* (2022.01)

(56) References Cited

U.S. PATENT DOCUMENTS

| | | | |
|---|---|---|---|
| 5,210,426 | A | 5/1993 | Itoh et al. |
| 5,929,413 | A | 7/1999 | Gardner |
| 6,314,407 | B1 | 11/2001 | Maeno |
| 6,731,778 | B1 | 5/2004 | Oda et al. |
| 7,222,782 | B2 | 5/2007 | Lute, Jr. et al. |
| 7,284,692 | B1 | 10/2007 | Douglass |
| 8,175,973 | B2 | 5/2012 | Davis et al. |
| 8,474,700 | B1 | 7/2013 | Lewis et al. |
| 8,511,542 | B2 | 8/2013 | Pan |
| 9,033,221 | B1 | 5/2015 | Ramachandran et al. |
| 2001/0052546 | A1 | 12/2001 | Imai |
| 2003/0023554 | A1 | 1/2003 | Yap et al. |
| 2003/0177353 | A1 | 9/2003 | Hiltgen |
| 2004/0215566 | A1 | 10/2004 | Meurer |
| 2005/0085931 | A1 | 4/2005 | Willeby |
| 2006/0138241 | A1 | 6/2006 | Kitazawa |
| 2006/0163343 | A1 | 7/2006 | Changryeol |
| 2006/0179044 | A1 | 8/2006 | Rosenberg |
| 2007/0244830 | A1 | 10/2007 | Hilderman |
| 2009/0201372 | A1 | 8/2009 | O'Doherty et al. |
| 2009/0212104 | A1* | 8/2009 | Smith .................. G07F 7/04 235/379 |
| 2010/0145852 | A1 | 6/2010 | Morson |
| 2011/0302084 | A1 | 12/2011 | Melik-Aslanian et al. |
| 2013/0048713 | A1* | 2/2013 | Pan .................. G07F 19/207 235/379 |
| 2014/0081874 | A1 | 3/2014 | Lewis et al. |
| 2014/0162598 | A1 | 6/2014 | Villa-Real |
| 2014/0183258 | A1 | 7/2014 | DiMuro |
| 2014/0241523 | A1 | 8/2014 | Kobres et al. |
| 2015/0220956 | A1 | 8/2015 | Curtis |
| 2015/0287289 | A1 | 10/2015 | Lewis et al. |
| 2016/0012465 | A1 | 1/2016 | Sharp |
| 2016/0239733 | A1* | 8/2016 | Hertz ................. H04W 4/029 |
| 2016/0343055 | A1 | 11/2016 | Blinn et al. |
| 2018/0129262 | A1 | 5/2018 | Veiga et al. |
| 2018/0285879 | A1* | 10/2018 | Gadnis ............... G06Q 20/425 |
| 2019/0251540 | A1 | 8/2019 | Shimura |
| 2020/0005044 | A1* | 1/2020 | Nakamura ........... G06V 20/52 |

\* cited by examiner

Method 300

Method 400

Method 500

SYSTEMS AND METHODS FOR CARD-HANDLING BY POINT OF SALE DEVICES

CROSS-REFERENCE TO RELATED APPLICATIONS

The subject application is a continuation of U.S. patent application Ser. No. 17/993,649 filed Nov. 23, 2022, which is a continuation of U.S. patent application Ser. No. 16/743,106 filed Jan. 15, 2020, now U.S. Pat. No. 11,538,326 issued Dec. 27, 2022, which is a continuation of U.S. patent application Ser. No. 16/394,208 filed Apr. 25, 2019, now U.S. Pat. No. 10,573,163 issued Feb. 25, 2020, the contents of which are hereby incorporated by reference in their entireties.

FIELD OF THE INVENTION

This disclosure relates to point of sale device configured to alert a user if the user forgets or leaves a payment card or other account-linked card in a point of sale device or card reader.

BACKGROUND

Automated Teller Machines (ATMs) and account-linked cards are useful for performing several banking transactions and inquiries. Account-linked cards have become commonplace, as many individuals use account-linked cards such as those for access to membership club accounts, rewards accounts, gyms, parking facilities, secured buildings, accounts at banking institutions, accounts for mass transportation and other types of accounts. Account-linked cards are frequently used with card readers or devices equipped with card readers, some of which require the account holder to insert the account-linked card containing information on a magnetic strip or embedded memory into the card reader. After the card has been read and authenticated, the account holder may be able to carry out a variety of transactions or inquiries.

The traditional manner of initiating a transaction or inquiry using an ATM is to insert an account-linked card into a card reader, thereby allowing the card reader to receive information associated with a user's account from the card. In some instances, the card remains inserted in the reader, or the ATM retains possession of the card, until the user has completed a transaction. At that point, the user may be responsible for retrieving the card, or the ATM may present the card for the user to take. In some instances, the user may forget to retrieve the card from the card reader and may leave the area without the card. In that situation, some card readers are configured to ingest or swallow the account-linked card so that once the customer has left the area of the card reader, the account-linked card is no longer accessible to prevent persons other than the account holder from obtaining the card.

When a card is ingested, this may cause significant inconvenience to the account holder. If a card reader has ingested a user's account-linked card, the user will no longer be able to use the account-linked card to access their accounts at the card reader or execute transactions using the card. Frequently, the user's only option for obtaining a working account-linked card is to call the institution that issued the account-linked card, cancel the account-linked card, and order a replacement card to be sent through the mail. This process can be time consuming and leave the customer without sufficient access to their accounts.

This processes may also be costly to the institution that issued the account-linked card. The issuing institution must bear the cost of creating and shipping a replacement card for the user if the user is to resume utilizing the account-linked card. The institution also misses the opportunity to collect fees associated with any transactions the user is unable to perform during the period the use is without an account-linked card.

By applying automated, computer-based interpretation and/or analysis of visual information obtained with a camera, a card-reader device may be able to determine if a user has left or is about to leave an ATM, point of sale (POS), or card reader without retrieving an account-linked card. Automated interpretation of video data may be known as computer vision.

What is needed is an ATM, point of sale (POS), or card reader device which utilizes computer vision techniques to determine if a user has left or is about to leave an area without retrieving an account-linked card and notifies the user, reminding the user to take his card. This saves the user the inconvenience of going without an account-linked card until it is replaced and also saves the issuing institution the costs of creating and shipping a replacement card.

SUMMARY

Therefore, it is an object of this disclosure to describe a point of sale, ATM, or card reader device which is configured to determine when a user is leaving or is no longer present at the ATM using computer vision techniques.

It is a further object of the invention to describe a point of sale, ATM, or card reader which is configured to notify a user who has left an area, or is in the process of leaving an area without retrieving an account-linked card.

Embodiments of the present disclosure provide a point of sale (POS) device comprising: a processor; a card sensor in data communication with the processor, the card sensor configured to detect the presence of a card within the POS device and provide a card notification to the processor when the card is inserted into the POS device and removed from the POS device. Embodiments also comprise a camera in data communication with the processor, the camera configured to observe the presence and absence of a user proximate to the POS device and provide a user notification to the processor regarding the presence or absence of the user. Upon receipt of a card notification from the card sensor that the card is inserted into the POS device and receipt of a user notification from the camera of the absence of the user, the processor is configured to send a message to a communication device associated with the user indicating that the card is inserted into the POS device.

Embodiments of the present disclosure provide a user alert method comprising: detecting the presence of a user at a point of sale (POS) device using a camera in data communication with a processor. The camera is configured to observe the presence and movement of a user proximate to the POS device. The method comprises detecting the presence of a card within the POS device using a card sensor in data communication with the processor, the card sensor configured to detect the presence of a card within the POS device. The method further comprises determining when the user moves away from the POS device using the processor and camera; and sending a message to a mobile device associated with the user upon detecting the presence of a card within the POS device and determining the user has moved away from the POS device.

Further features of the disclosed designs, and the advantages offered thereby, are explained in greater detail hereinafter with reference to specific example embodiments illustrated in the accompanying drawings.

DETAILED DESCRIPTION OF EXEMPLARY EMBODIMENTS

The following description of embodiments provides non-limiting representative examples referencing numerals to particularly describe features and teachings of different aspects of the invention. The embodiments and features described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

It will be understood that while some embodiments are disclosed in the context of an automated teller machine (ATM) or point of sale device (POS) for illustrative purposes, the present invention is not limited to ATMs or point of sale devices. An ATM, POS, or other device equipped with a card reader may be utilized in place of any other ATM, POS, or card reader equipped device without limitation.

When a user utilizes an ATM, POS, or other device equipped with a card reader, the user typically inserts an account-linked card into the card reader. The card may contain information about the user personally and/or the user's accounts. The card reader device typically reads the card, authenticates the user, and initiates a transaction. A disclosed card reader device utilizes computer vision and/or other techniques to monitor the user and determine if the user has left the device without retrieving a card. In some embodiments, the device determines if the user is indicating that the user is going to leave the device without retrieving the card. If the card reader device determines that the user has left or is about to leave without retrieving his card, the device alerts the user, prompting the user to retrieve the card. It will be appreciated that multiple types of card readers may be used with an ATM, POS, or kiosk. In some ATMs, the card reader is a slide-type card reader in which the user maintains possession of the card while sliding a magnetic stripe through the reader. In some ATMs, the card reader is chip reader device in which the user inserts a card but the card remains physically accessible to the user at all times. In some ATMs, the card reader is an internal card reader. In such embodiments, a user inserts a card into the card reader and the card is taken into the ATM where it is physically inaccessible to the user or any potential passers-by. In such embodiments, the card may be retained within the ATM during a transaction, where it is physically inaccessible, and may then be presented to the user once the transaction is complete.

Figure 1:
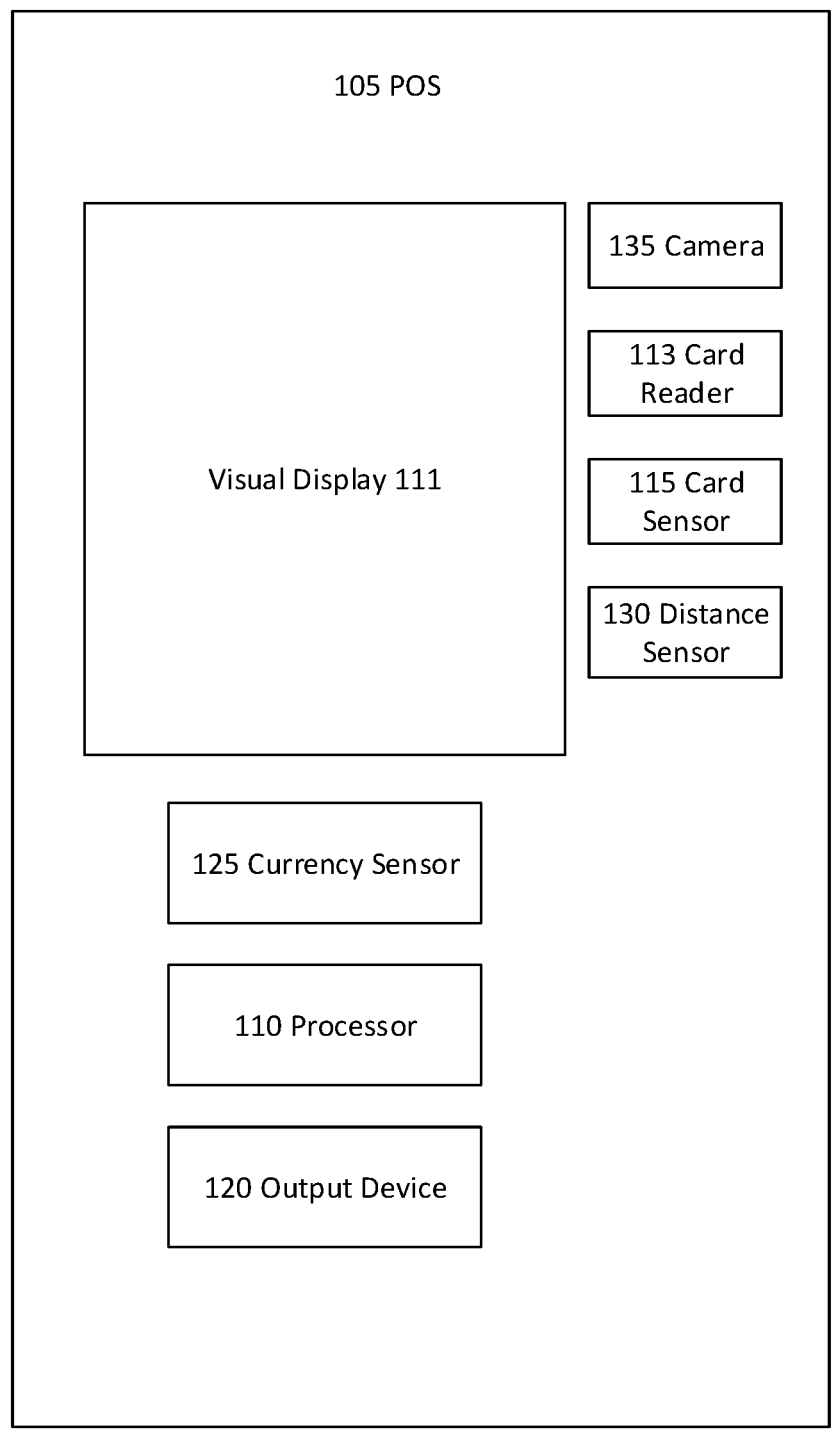
FIG. 1 illustrates a point of sale system according to an example embodiment.

FIG. 1 illustrates an exemplary embodiments of a disclosed point of sale (POS) device 105. In this exemplary embodiment, POS device 105 comprises a processor 110, visual display 111, a card reader 113, a card sensor 115, an output device 120, a currency sensor 125, distance sensing equipment 130, and a camera 135. It is understood that not all embodiments include every component of the exemplary embodiment of FIG. 1. It is also understood that, while FIG. 1 depicts a single instance of each component, embodiments may contain multiple instances of any components.

In some embodiments, card sensor 115 is in data communication with processor 110 and configured to detect the presence of a card within the POS device 105. The card sensor 115 provides the processor with a card notification when a card is inserted into or removed from card reader 113 and/or the POS device 105.

In some embodiments, the camera 135 may include, but is not limited to, a digital camera, video camera, a still camera, and/or other optical imaging device. Camera 135 is in data communication with the processor 110 and may be configured to observe the presence and absence of a user proximate to the POS device 105. The camera may be configured to provide a user notification to the processor regarding the presence and/or absence of a user. In some embodiments, the camera may be configured to monitor the movements of a user to detect movements indicating the user is approaching and/or moving away from the POS device. In such embodiments, the camera may send a user movement notification to the processor. In some embodiments, the camera may be configured to monitor movements of the user's head, body, arms, and/or hands to detect behaviors indicating that the user is about to move away from the POS device.

In some embodiments, the disclosed processor includes a computer vision processor. It will be appreciated that the processor may be configured to execute computer vision applications, programs, software, and/or techniques which may be stored on local and/or remote servers and/or memory. In some embodiments, if the processor receives a card notification from the card sensor indicating that a card is inserted into the POS device and receives a user notification from the camera or a processor in communication with the camera indicating the absence of the user, the processor may send a message to a communication device associated with the user indicating that the user's card is still inserted in the POS device.

In some embodiments, the processor is configured to analyze visual data provided by the camera using facial recognition techniques. In some embodiments, the camera and/or processor may detect the presence of a user based on facial recognition.

In some embodiments, currency sensor 125 is configured to detect the presence and/or absence of currency. This may indicate when the user retrieves currency which has been dispensed to the user. The currency sensor is in data communication with the processor and configured to send a currency notification to the processor when the user removes currency from the POS device. In some embodiments, the processor will not send a message to the user until the currency sensor has indicated that the user has removed currency from the POS device.

In some embodiments, POS device 105 may be an ATM, kiosk, terminal, and or other device in which a user inserts an account-linked card or other form of identification and/or information into a card reader.

In some embodiments, visual display 111 may include, but is not limited to a standard video monitor, a touch screen display, a cathode ray tube, and/or LED display.

In some embodiments, the output device 120 may include but is not limited to a speaker, siren, whistle, light, strobe light, and/or combinations of the above. In some embodiments, the output device may be an input/output device such as, for example, a touch screen display.

In some embodiments, distance sensing equipment 130 may include, but is not limited to laser range finders, LIDAR, RADAR, RGB-D cameras, and/or ranging cameras.

Figure 2:
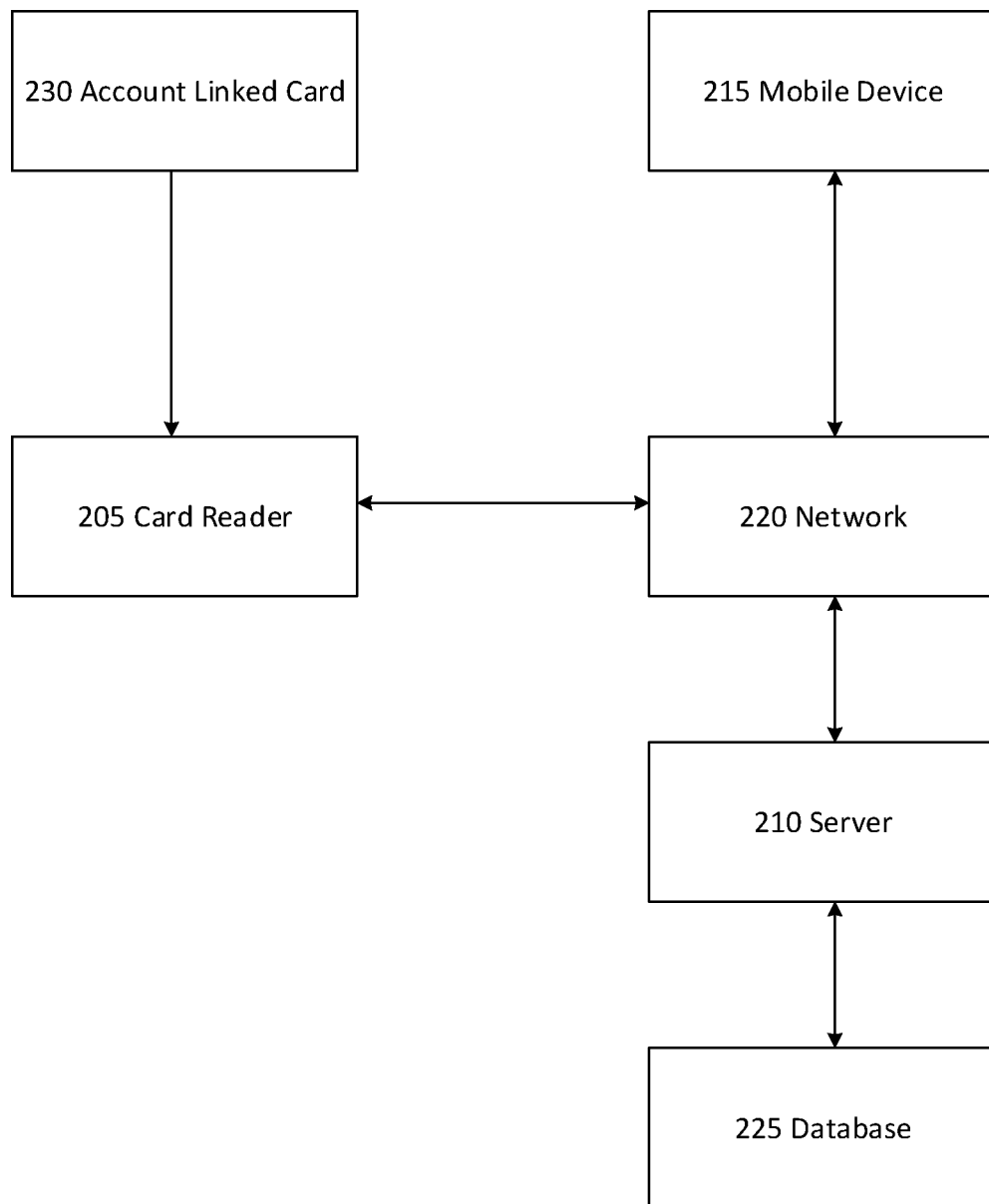
FIG. 2 illustrates a card reader system according to an example embodiment.

An example embodiment of a system for alerting a user who has left an account-linked card in a card reader is shown in FIG. 2. The system 200 includes a card reader 205 which can read and authenticate an account-linked card 230. The card reader 205 is connected to a network 220 which can be the Internet, a wide area network (WAN), or another suitable type of network. The card reader 205, like other elements of system 200, may be connected to the network 220 via a wireless connection or a wired connection.

A server 210 may also be connected to the network 220. The server 210 includes a processor and a memory for storing instructions executable by the processor. The server 210 is capable of accessing a database 225 which includes one or more storage media and stores various data associated with one or more accounts. As shown in FIG. 2, the server 210 may be connected directly to the database 225, though database 225 could alternatively be incorporated within the server 210, accessed by the server 210 via a network, or configured in any other suitable way for access by the server 210. Database 225 may additionally be functionally distributed across two or more hardware units accessible by the server 210.

The card reader 205 is a device capable of reading and authenticating account-linking information stored on the account-linked card 230. The card reader 205 may include a display for displaying a graphical user interface to a user and/or account holder. The card reader 205 may further include a keypad, a keyboard, and/or a touch screen interface by which the account holder can input information. The card reader 205 preferably includes a processor and a memory which stores instructions for execution by the processor.

The card reader 205 may include a slot or another receptacle for receiving and reading the account-linking information stored on the account-linked card 230. The account-linked card 230 may be any secure card such as a magnetic strip card which stores account-linking information in a magnetic strip, a smart card having an integrated circuit and memory which stores account-linking information in the memory, or a card implementing radio frequency identification technology.

In ordinary use, an account holder may insert her account-linked card 230 into the card reader 205. The card reader 205 may then prompt the account holder via the graphical user interface on the display to authenticate the account-linked card 230, for example, by entering a personal identification number (PIN), or by other means. If successfully authenticated, the card reader 205 may display the account holder's account information to the account holder via the graphical user interface and may also allow the account holder to make transactions.

In this example embodiments, when preparing to display account information to the account holder, the card reader 205 sends a request to the server 210, which may be in the form of an application programming interface (API) call, via the network 220 requesting account information. The server 210 retrieves the requested information from the database 225 and sends it back to the card reader 205 via the network 220 for display to the account holder in the graphical user interface.

System 200 may also include a mobile device 215, which may be associated with the account holder of an account associated with the account-linked card 230. The mobile device 215 is suitable for receiving notifications sent by the server 210 via the network 220 relating to the account-linked card 230 or the account associated with the account-linked card 230. The mobile device 215 may be a smart phone or any other network connected device suitable for receiving notifications.

Exemplary embodiments may include one or more networks. In some examples, the network 220 may be one or more of a wireless network, a wired network or any combination of wireless network and wired network, and may be configured to connect a card reader and/or mobile device to a server. For example, the network may include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, the network may include, without limitation, telephone lines, fiber optics, IEEE Ethernet 902.3, a wide area network (WAN), a wireless personal area network, a local area network (LAN), or a global network such as the Internet. In addition, the network may support an Internet network, a wireless communication network, a cellular network, or the like, or any combination thereof. The network may further include one network, or any number of the exemplary types of networks mentioned above, operating as a stand-alone network or in cooperation with each other. The network may utilize one or more protocols of one or more network elements to which they are communicatively coupled. The network may translate to or from other protocols to one or more protocols of network devices. Although the network 220 is depicted as a single network in FIG. 2, it should be appreciated that according to one or more examples, the network may comprise a plurality of interconnected networks, such as, for example, the Internet, a service provider's network, a cable television network, corporate networks, such as credit card association networks, and home networks In some embodiments, the disclosed system may include one or more servers. In some examples, servers may include one or more processors, which are coupled to memory. A server may be configured as a central system, server or platform to control and call various data at different times to execute a plurality of workflow actions. A server may be configured to connect to the one or more databases. A server may be connected to at least one client device, communication device, and/or mobile device.

In some embodiments, the disclosed account-linked card is a payment card, such as a credit card, debit card, or gift card. Information related to the issuer, card holder, and/or associated vendor may be displayed on the front or back of the card. In some examples, the payment card may comprise a dual interface payment card. In some embodiments, the card is not related to a payment card, and may comprise, without limitation, an identification card, security card, loyalty card, smart card, and/or access card.

In some embodiments, the camera may include but is not limited to a digital camera, video camera, still picture camera, and/or other imaging devices. In some embodiments the camera may include, but is not limited to, a thermal or infrared imaging device and/or presence detector such as, for example, a proximity sensor, motion sensor, LIDAR detector, sonar, and/or distance sensing equipment. It will be appreciated that the term "camera" is not limited to conventional optical imaging devices. In some embodiments, one or a plurality of cameras may contain an integral processor and/or be operably connected to a processor configured for computer vision.

In some embodiments, the camera is positioned to view a user inserting a card into a card reader. The camera is operably connected to a processor which is configured to receive visual data from the camera and analyze the visual data in order to make determinations. This automated process may be referred to as computer vision. In some embodiments, the camera is maintained in a fixed position and is not configured to pan, tilt, or zoom. This may increase the accuracy of a computer vision system as a fixed position camera may have a substantially static background. It will be understood that in some embodiments, a static background may be temporarily obscured by a significant number of moving objects, such as, for example, vehicle and/or pedestrian traffic.

In some embodiments, the camera and/or computer vision processor may be configured to establish a background over time. For example, a building in view of the camera may be renovated over time. By allowing a computer vision system to periodically update and/or average a background image, the computer vision system may be configured to adapt to changes in the background in order to reduce and/or eliminate false alerts.

In some embodiments, the processor is configured to perform automated interpretation of visual data received from the camera in real time. In some embodiments, multiple sources of visual data, such as cameras, video cameras, and/or other optical devices may be used. In some embodiments, utilizing multiple cameras, or sources of visual data which are positioned to view the same or similar scene from different angles may allow the computer vision system to make more accurate determinations regarding the location and/or movement of an object, such as, for example, a user. In some embodiments, utilizing two or more cameras positioned to view the same or similar scene from substantially the same angle may allow the computer vision system to utilize stereo vision techniques in order to make more accurate determinations regarding the location and/or movement of an object.

In some embodiments, a camera may contain or be connected to a processor which performs user detection on the scene viewed by that camera and may generate a "bounding box" (or other additional information) for a user in a frame. In some embodiments, a processor may generate a bounding box for individual portions of the user including, but not limited to the user's arms, head, torso, and/or hands. In some embodiments, the processor may generate a bounding box for the user's purse and/or wallet.

In some embodiments, a camera may transmit bounding box data to a processor, which aggregates possible user data from multiple cameras. Such embodiments may allow the processor to more accurately determine user presence and/or determine when a user is indicating that she is about to leave an area. The use of multiple cameras may increase the overall accuracy and effectiveness of the system utilizing triangulation and/or false-alarm rejection.

The process of user detection may include one or a plurality of computer vision and/or feature detection algorithms including, but not limited to a histogram of oriented gradients (HOG), integral channel features (ICF), aggregated channel features (ACF), and/or deformable part models (DPM). In some embodiments, tracking algorithms may also be utilized including, but not limited to Kalman filters, particle filters, and/or Markov chain Monte Carlo (MCMC) tracking approaches.

Different algorithms may provide unique performance characteristics in terms of accurately detecting a user and/or user movements as well avoiding false alarms. Each computer vision and/or feature detection approach may also provide differing performance characteristics based on the lighting and/or other visual characteristics of a particular deployment.

In some embodiments, user and/or object detections can be aggregated temporally within a camera and/or processor to reduce false alarms and improve the probability of detection by keeping track of person and/or object detection confidences over time within a camera view. This may reduce or prevent false alarms and improve the reliability of the over-all system.

In some embodiments, computer vision determinations may be utilized in combination with a predictive model in order to determine the probability of a user departing from a card reader device without retrieving a card. The predictive model may be developed based on historical information related to use of a card reader device. Such information may include, but is not limited to, user position, user speed, user movements, and/or an identified sequence of transaction steps and/or user behaviors.

In one non-limiting example, a predictive model may be developed based on the length of time a user utilizes an ATM before retrieving their card and/or departing from the ATM. A predictive model may understand that most users utilize an ATM for a single transaction that lasts approximately 90 seconds and involves a particular sequence of transaction steps. Using this information, the predictive model may reject indicators that a user is going to leave an area in significantly less than 90 seconds after the user has inserted a card into the ATM. For example, it is unlikely a user would depart from an ATM within the first ten seconds of initiating a transaction. In some embodiments, the disclosed predictive model may be used as a confirmation to limit the number of false alarms generated by a computer vision processor.

In some embodiments, a computer model and/or predictive model may incorporate variables related to the position and/or movements of a user. For example, a predictive model and/or computer model may observe user position and/or user movements using a camera and computer vision processor in order to develop a model of positions, movements, and/or behaviors which precede the user leaving the ATM. In some embodiments, the computer model may include variables relating to a sequence of user positions or movements.

The disclosed system may include multiple and/or redundant systems. In some embodiments a processor aggregates input from a computer vision system as well as a predictive model in order to make a determination of whether a user has departed or is about to depart from an ATM without retrieving a card which has been inserted into a card reader.

In some embodiments, a card reader device may be configured to execute multiple computer vision and/or facial recognition techniques. Such embodiments may determine which technique or combination of techniques is most effective once the physical system has been installed at a particular location. In some embodiments, the disclosed system may include a training routine or initialization program designed to determine which of a plurality of computer vision and/or facial recognition techniques is best suited for a particular application.

In one non-limiting example, using object detection and/or bounding boxes to keep track of a person detected using facial detection or facial recognition techniques may reduce false alarms or inaccurate detection of a user. If the user turns, bends, or otherwise obscures their face temporarily, some embodiments may use object detection and/or bounding boxes to continue to track the user despite being unable to clearly view the user's face. Some embodiments may use object permanence logic and/or encoded rules in order to avoid confusing a detected user with a different individual who may also be in view of the computer vision system. It will be appreciated that facial detection techniques may be utilized to detect the presence of a face and facial recognition techniques may be utilized in order to identify, track, or monitor a particular user's face.

In some embodiments, computer vision information may be screened in order to reduce and/or limit inaccurate information. In one, non-limiting example, human motion is known to occur within reasonable limitations. In some embodiments, a computer vision system may monitor the speed at which a user approaches or departs from an ATM. If a computer vision system determines that a user has approached or departed from the ATM at a speed outside the reasonable limits on human movement, this information may be flagged or rejected. In one non-limiting embodiments, if the average speed at which a user approaches or departs from an ATM is determined to be approximately 3 miles per hour. Therefore, any report of a user approaching or departing from an ATM at greater than 10 miles per hour likely represents an inaccurate report.

Using the systems, methods, and techniques disclosed herein, a card-reader device, point of sale, and/or ATM is able to alert a user who departs from a card reader without retrieving a card. By alerting and/or notifying a user who has left, or is about to leave an area without retrieving a card, the user can be reminded to retrieve the card, thereby saving both the user and the card issuer the cost and inconvenience of replacing the card.

In one example embodiment, a user approaches an ATM equipped with a camera which is in data communication with a computer vision processor. The user inserts a card into the card reader in order to initiate a transaction. The card sensor transmits a signal to the processor that a card has been inserted into the card reader. The camera is configured to observe the user and/or the user's movements while the user is at the ATM. The user follows the graphical user interface prompts in order to perform the desired transaction. In this example, the transaction involves the user withdrawing currency from the ATM. Once the user has retrieved the currency from the ATM, the user turns to walk away. The camera and computer vision processor are configured to capture and interpret visual data showing the user turning and then walking away from the ATM. The processor is in data communication with the card sensor, which indicates that the card has not been retrieved from the card reader. Once the processor determines that the user is leaving the area and has not retrieved the card, the processor initiates a user notification.

In some embodiments, an example notification may include, but is not limited to an audible alert issued by an output device. The ATM may include a speaker which is configured to beep, whistle, or issue an audible statement, informing the user that she has not retrieved her card. As an example, the output device may be configured to issue the statement "Don't Forget Your Card" when the processor determines that the user is leaving the ATM and has not retrieved her card.

In some embodiments, the processor, which is operably connected to the card reader, may cause the output device to include the user's first name, last name, and/or full name as part of an issued statement. The card reader may read the user's name stored on the account-linked card, and transmit the user's name to the processor. The processor may then cause the output device to issue a personalized audible alert such as, for example, issuing the statement "Jane Smith, Don't Forget Your Card."

In some embodiments, in addition to an immediate audible alert, the ATM may be configured to activate a light, strobe, whistle, beep, and/or siren to get the user's attention and remind the user to retrieve her card.

In some embodiments, the camera observes the user after the audible notification has been issued to determine if the user returns to the ATM and retrieves the card. If the user does not return to retrieve the card, or if the user does not retrieve the card within a predetermined time period, the processor may be configured to send a notification to a mobile device associated with the user. In such embodiments, the processor may instruct a network connected server to send a text message, SMS, and/or phone message to one or a plurality of mobile devices associated with the user and/or account holder based on information stored on the card. In some embodiments, the ATM may additionally or alternatively send an email to one or a plurality of email address associated with the user based on information stored on the card. In some embodiments, if the user does not return to retrieve the card, or if the user does not retrieve the card within a predetermined time period, the processor may be configured the instruct a digital wallet application or other application associated with the user to issue an alarm such as, for example, an audible notification, a siren, a vibration, or a strobe light.

Figure 3:
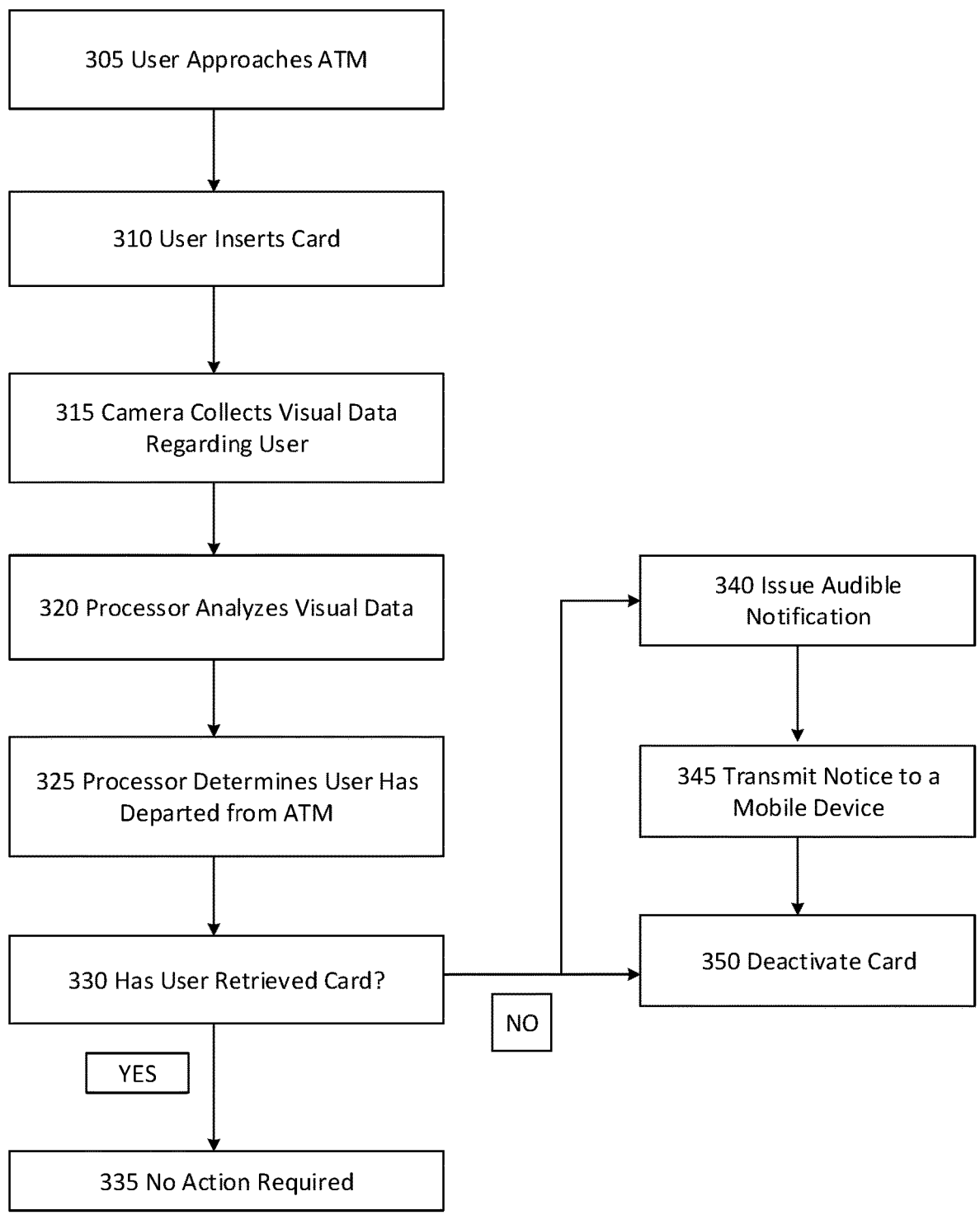
FIG. 3 is a flow chart illustrating the operation of a disclosed ATM system according to an example embodiment.

FIG. 3 shows a method 300 of utilizing a card reader, ATM, and/or POS device in order to alert a user who has failed to retrieve a card. At step 305, a user approaches the ATM. As the user approaches the ATM, the user enters the field of view of a camera. At step 310, the user inserts an account-linked card into the card reader of the ATM. In some embodiments, the ATM registers the presence of the card using a card sensor. The user may be prompted to enter a PIN or other authentication by the user interface of the ATM and then be allowed to perform various transactions using the account associated with the user's account-linked card. In step 315, the camera collects visual data regarding the user and transmits visual data to a computer vision processor. In step 320, the processor analyzes the visual data and determines, in step 325, that the user has departed from the ATM. The processor may also determine, using computer vision or a card sensor, in step 330, if the user has retrieved her card. If the user has already retrieved her card, in step 335, the ATM may determine that no further action is required. If the user has not retrieved her card, in step 340, the ATM issues an initial notification reminding the user to retrieve her card. The initial notification may be a statement including the user's name. In step 345, the ATM transmits a reminder notification to a communication device and/or mobile device associated with the user. In some embodiments, the ATM may use a chip card reader which leaves the card physically accessible to the user or any passers-by in the area. In step 350, if the user has not retrieved her card, the card may be deactivated to prevent someone other than the user from obtaining and using the card.

In some embodiments, the disclosed ATM or other card reader device may send a code to the user's mobile device and/or email address. The ATM may retain the user's card so that the card is physically inaccessible to the user or any passers-by for a predetermined period of time after sending the message. If the user returns to the ATM within a predetermined period of time, the user may be able to enter the code in order to retrieve the card. In such embodiments, upon receiving the code, the ATM may present the card to the user, allowing the user to physically access the card again. In some embodiments, the ATM may maintain the user's transaction session for a predetermined period of time. In some embodiments, the camera is configured to detect the presence of a user based on facial recognition and the processor is configured to end a user's transaction session upon recognition of a different user proximate to the ATM. This may allow the ATM to maintain a transaction session open and facilitate the return of a user's card for as long as possible without allowing a subsequent user to interact with the user's account through an open transaction session.

In some embodiments, if the user does not return to the ATM within a predetermined period of time, the ATM may ingest the card. In many embodiments, once the card is ingested, it may be destroyed or may otherwise be un-retrievable by the user.

In some embodiments, the ATM may be configured to extend a given time period prior to ingesting the card if the user responds to a notice sent to the user's mobile device. In an example, the ATM may be configured to issue an audible warning and send a notice to the user's mobile device upon determining that the user has left the ATM without retrieving her card. The ATM may then initiate, for example, a two-minute time period, after which the card will be ingested. This two-minute time period may be designed to allow the user to hear the audible alert and/or check her mobile device and return to the ATM prior to the card being ingested. In some embodiments, the two-minute window may be extended if the user responds to the message sent to her mobile device. For example, if the user responds to the message within 90 seconds, the ATM may extend the time window for an additional five minutes. This may allow the user to notice the message and respond, indicating that the user will return to the ATM even if the user is unable to return to the ATM within the original time window. It will be understood that the time period prior to ingesting a card, as well as the time period for allowing a user to return may be any pre-determined time period. Additionally, each time period may be extendable by any amount. The example embodiments are not intended to be limiting on these potential features.

In some embodiments, the user may be able to respond to the notice indicating that the user will return to the ATM at a specific time in the future, thereby creating a window of a predetermined duration at a later time.

In some embodiments, the ATM may be equipped with a temporary card storage which allows the ATM to resume normal operations while maintaining possession of a user's un-retrieved card without ingesting the card. In such embodiments, the ATM may be configured to return the card to a user who enters a code sent to the user's mobile device and/or email. In some embodiments, the ATM may confirm the user retrieving the card is the same user who abandoned the card using facial recognition techniques. In some embodiments, the ATM may send a second code to the user upon entry of the initial code. The second code may be designed to be active for a limited time window, such as, for example, less than one minute. This may help to ensure that the user attempting to retrieve the abandoned card is in physical possession of the user's mobile device and/or has real-time access to the user's email, thereby reducing the ability of a third party to intercept any code sent from the ATM to the user and fraudulently obtain the user's card. If the user does not return to the ATM after a pre-determined period of time, the ATM is designed to ingest the card, thereby making the card un-retrievable.

In some embodiments, the ATM may utilize facial recognition techniques in order to compare the user attempting to retrieve the card with the user who initially abandoned the card. The ATM may additionally or alternatively utilize facial recognition techniques to compare the user attempting to retrieving the card to a facial recognition profile of an authorized user associated with the card. In some embodiments, only the authorized user, who is confirmed using facial recognition, may be allowed to utilize the card to initiate a transaction. This may be an added security feature in addition to requiring the user to enter a pin number or other form of password.

In addition to utilizing computer vision techniques, disclosed systems, ATMs, POSs, and card readers may be equipped with distance sensing equipment. In some example embodiments, the distance sensing equipment may be configured to be aimed at an individual user rather than maintained in a fixed positions. The distance sensing equipment may be in data communication with a processor. In some embodiments, the distance sensing equipment may be used to determine when a user is leaving an ATM.

In an example embodiment, when a user approaches an ATM and initiates a transaction, the user's torso will occupy a significant portion of a field of view of any cameras and distance sensing equipment mounted on the ATM. In addition to the computer vision techniques described herein, distance sensing equipment may be used to directly measure how far the user is from the ATM. While the user is utilizing the ATM, the user will be within a certain distance range such as, for example, between 1 and 3 feet away. If the user moves further from the ATM, as measured using distance sensing equipment, the distance sensing equipment may inform the processor that the user is leaving the ATM. The distance sensing equipment may transmit data to the processor indicating the user's distance from the ATM. This may allow the processor to determine if the user is actually leaving the area or if the user has merely taken a small step back. In some embodiments, the processor may use information from the distance sensing equipment in order to corroborate, verify, and/or confirm determinations made using computer vision techniques.

In some embodiments, the processor may be able to determine the rate and/or direction at which the user is departing the area. The processor may adjust the volume and/or timing of any alert issued by the ATM or sent to the user based on these determinations.

In some embodiments, when the ATM determines that the user has departed from the ATM without retrieving the user's card, the ATM may close any open dialog windows, thereby preventing anyone other than the original user from accessing the user's account if the user walks away without completing a transaction.

In some embodiments, the ATM, POS, and/or card reader device may be operably connected to a weight sensor. In some embodiments, the weight sensor is a pad positioned directly in front of an ATM, so that a user of the ATM stands on the weight sensor. The weight sensor may be configured to provide a notification to the processor when a user is standing on the weight sensor and/or when a user steps off of the weight sensor. This may provide additional corroboration, verification, and/or confirmation of any determination made using the disclosed computer vision techniques.

In some embodiments, the disclosed computer vision system may be configured to detect movements, behaviors, and/or features which indicate a user is about to leave an area before the user has actually left.

If a processor determines that a user is preparing to leave an ATM but has not retrieved a card, the system may issue an early notification reminding the user to retrieve her card. In some cases, this early notice reminds the user to take her card and eliminates the need to send a message to a mobile device associated with the user after the user has left the ATM without retrieving the card.

In some embodiments, the disclosed systems may utilize computer vision in order to observe the movements and/or position of a user including movements of the user's hands, arms, torso, and/or head. By observing the user's movements, the ATM may be able to develop and/or refine a computer model and/or database of motions or behaviors that precede the user departing from the ATM.

For example, if a user rotates her head and torso, so that the user is facing away from the ATM but has not retrieved her card, the processor may determine that the user is in the process of departing from the ATM without retrieving her card. This determination may be made even if the user is still in close proximity to the ATM. In such cases, an audible and/or visual alert reminding the user to retrieve her card may be very effective. If the user starts walking away, a second audible alert may be issued. In some embodiments, the second audible alert may include a different tone, pitch, or statement, and/or be issued at a greater volume that an initial audible alert. If the user does not respond to the audible alerts, the ATM may send a notification to the user's mobile device, reminding the user to return to the ATM and retrieve her card.

In some embodiments, facial recognition techniques may be used to determine when a user rotates her head in order to predict when a user is likely to leave an ATM. This may be used in addition to or instead of other techniques for determining when a user is leaving an ATM which are described herein.

In another example, a user's movements may be observed to determine that a user has retrieved currency from the ATM and inserted the currency into a purse and/or wallet. The ATM may determine that this behavior precedes the user departing from the ATM. If the user does not retrieve her card within a certain time period of inserting currency into her purse and/or wallet, the ATM may issue an audible warning reminding the user to retrieve her card.

In some embodiments, an ATM with computer vision capabilities described herein, may develop a library of intent to leave behaviors based on observations of movement and/or behaviors which occur at the ATM. For example, an ATM may be configured to observe all ATM users and record information related to the user movements, timing, and sequential transaction steps. Over time, the ATM may generate a strong association between a user retrieving currency, putting the currency in her wallet, retrieving a card, and then, approximately 10 seconds later, departing from the ATM. If an ATM observes a user's arm movements and determines that the user has retrieved currency and put it in her wallet, but has not yet retrieved the user's card after a predetermined time period. The ATM may elect to issue a notification reminding the user to retrieve her card.

In some embodiments, the ATM may develop a library of other behaviors which are associated with departing the ATM without retrieving a card and issue an initial notification reminding users to retrieve their cards.

In some embodiments, the ATM may observe which notifications are effective at causing the user to notice and return to retrieve a card. Over time, the ATM may refine the notifications in order to improve the response rate. Such refinements may include, for example, changing the volume, pitch, and/or tone of a notification and/or changing the content and/or timing of an issued statement.

In some embodiments, an ATM may determine that particular characteristics of users are more likely to respond to different notifications. In such embodiments, the ATM may utilize a user's characteristics such as by information stored on the user's card and adjust any notifications in order to most effectively remind the user to retrieve a card. For example, over time, an ATM may determine that a user responds most consistently to issued statements which begin with the user's first name. Some embodiments may also determine that other users respond most consistently to issued statements which begin with the user's full name. Based on such determinations, a personalized audible warning may be generated for individual users.

Figure 4:
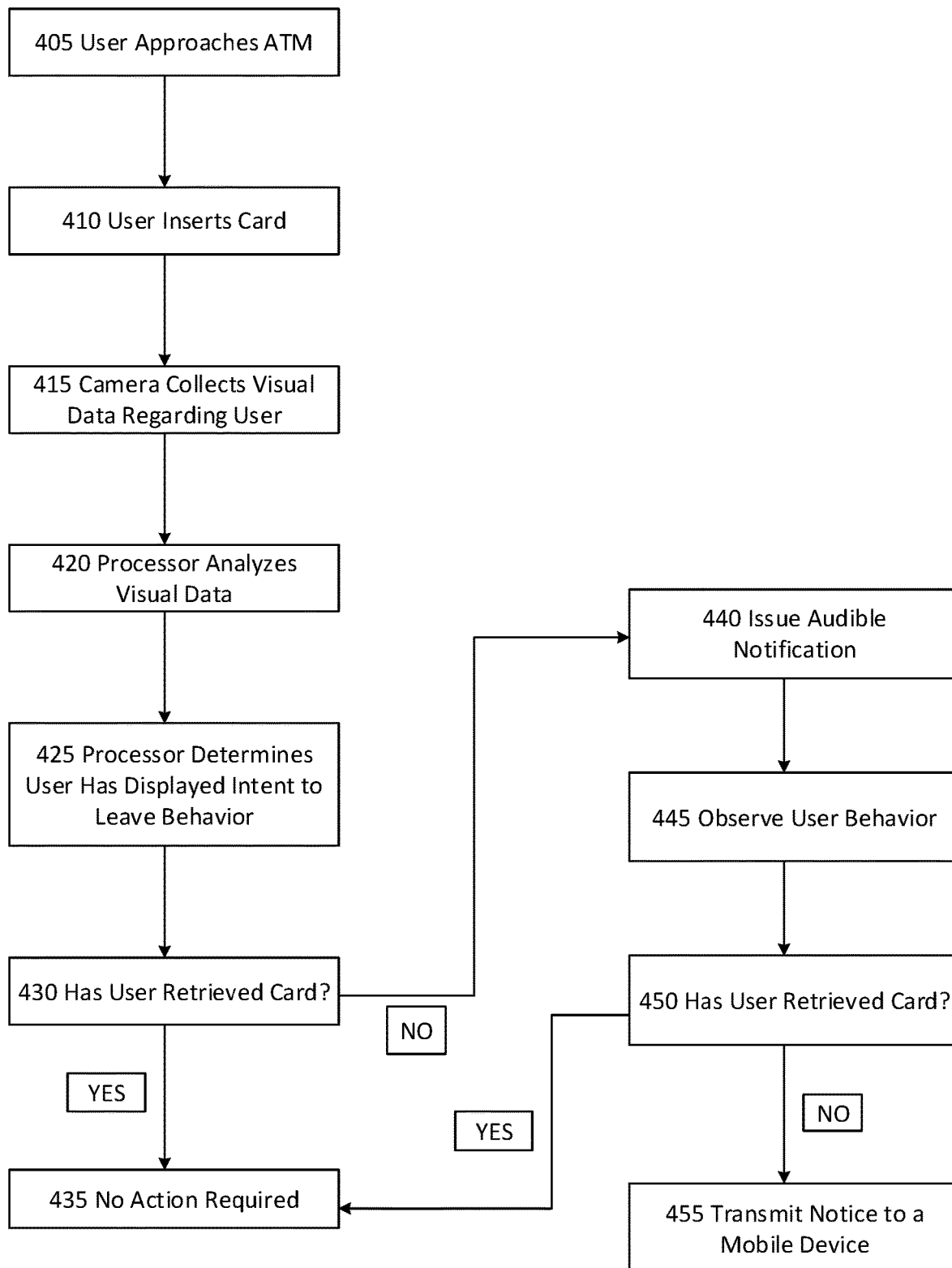
FIG. 4 is a flow chart illustrating the operation of a disclosed ATM computer vision system according to an example embodiment.

FIG. 4 shows an example embodiment of a method 400 of notifying a user who has departed from an ATM without retrieving a card. At step 405, a user approaches the ATM. As the user approaches the ATM, the user enters the field of view of a camera and distance sensing equipment. At step 410, the user inserts an account-linked card into the card reader of the ATM. In some embodiments, the ATM registers the presence or absence of the card directly using a card sensor. The user may be prompted to enter a PIN or other authentication by the user interface of the ATM and then be allowed to perform various transactions using the account associated with the account-linked card. In step 415, the camera collects visual data regarding the user and transmits visual data to a computer vision processor. In step 420, the processor analyzes the visual data and determines if the user has displayed any intent to leave behaviors such as, for example, inserting currency into a wallet or purse, placing any items in the user's pockets, operating a mobile device, and/or turning away from the ATM. In step 425, the ATM determines that the user has displayed an intent to leave behavior. In step 430, the processor may determine whether or not the user has retrieved her card. The processor may determine whether the user has retrieved her card using computer vision or may utilize the card sensor to determine if the user has retrieved her card. If the user has already retrieved her card, in step 435, the ATM determines that no reminder notification is necessary. If the user has not retrieved her card, in step 440, the ATM may issue an initial notification reminding the user to retrieve her card. In step 445, the ATM may continue to observe the user using a camera after the initial notice is issued. In step 450, the ATM again determines whether or not the user has retrieved her card. If the user retrieves her card, the ATM may determine that no subsequent notifications are required. If the user departs from the ATM without retrieving her card, in step 455, the ATM may issue a second audible and/or visual notification and/or may transmit a notification to a mobile device associated with the user.

Figure 5:
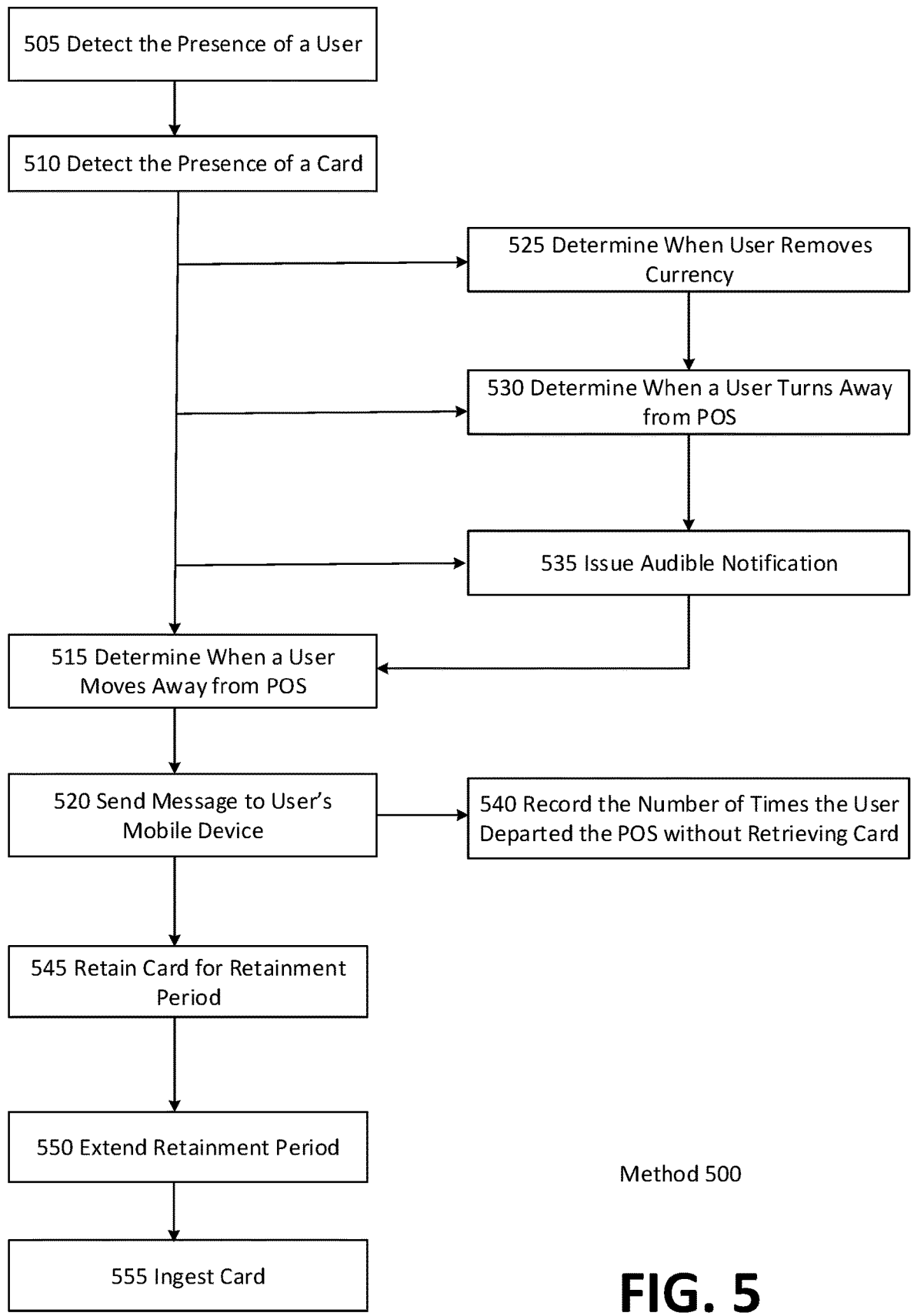
FIG. 5 is a flow chart illustrating the operation of a disclosed POS system according to an example embodiment.

FIG. 5 shows an example embodiment of a user alert method 500 utilizing a point of sale device. In step 505, the method comprises detecting the presence of a user at the POS device using a camera which is in data communication with a computer vision processor. The camera is configured to observe the presence and movement of a user who is approaching and/or proximate to the POS device. In step 510 the POS detects the presence of a card within the POS device using a card sensor which is in data communication with the processor. The card sensor is configured to detect the presence and/or absence of a card within the POS device. In step 515, the POS device determines when the user moves away from the POS device using the processor and camera. In step 520, if the POS device detects the presence of a card within the POS device and determines that the user has moved away from the POS device, the POS device sends a message to a mobile device associated with the user.

In some embodiments, method 500 also includes, in step 525, determining when and/or if a user has removed currency from the POS device. This determination may be performed using a currency sensor or may be performed using computer vision. When computer vision is used to determine if a user has removed currency from the POS device, the camera observes the user's movements and relays the visual information to the computer vision processor. The computer vision processor may be configured to interpret the user's movements and may also be configured to extract the feature of currency from the visual data provided by the camera.

In some embodiments, method 500 also comprises, the steps of 530 determining when a user turns her body away from the POS device and 535 issuing an audible notification when a user turns away. In some cases, this initial notification will alert the user to the fact she has not retrieved her card and prevent the user from departing the area without the card.

In some embodiments, method 500 also comprises the step of 540 recording the number of events in which a particular user has moved away from the POS device while a card was inserted in the POS device. Over time, the POS may develop a profile and/or score associated with users who are more likely to leave the POS without retrieving their cards. If the POS determines that a user has a history of leaving the POS without retrieving her card, the POS may adjust operation of the user interface in order to remind the user to retrieve her card before the user completes a transaction.

If the user departs from the POS device without retrieving her card, in step 545, the POS may retain the card for a predetermined retainment time period. If the user responds to the message indicating that that she has left her card at the POS on her mobile device, in step 550 the POS device may extend the retainment period. In some embodiments, once the retainment period expires, in step 555, the POS ingests the card.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. A method of alerting a user of a card, comprising:
  determining, by a processor of a card reader, that the card is inserted into the card reader;
  determining, by the processor of the card reader, an absence of the user within a vicinity of the card reader;
  transmitting, by the processor to a mobile device of the user, a first message including a first code and indicating the card has not been retrieved from the card reader;
  receiving, by the processor, entry of the first code;
  transmitting, by the processor to the mobile device of the user, a second message including a second code;
  receiving, by the processor, entry of the second code; and
  instructing, by the processor, the card reader to release the card.

2. The method of claim 1, wherein the step of determining, by a processor of a card reader, that the card is inserted into the card reader, comprises:
  detecting, by a card sensor, a card insertion into the card reader; and
  transmitting, by the card sensor to the processor, a notification indicating that the card is inserted into the card reader.

3. The method of claim 1, further comprising retaining the card for a retainment time period, the retainment time period being extendable if the user responds to the first message within a response time period.

4. The method of claim 1, wherein the step of determining, by the processor of the card reader, an absence of the user within a vicinity of the card reader, comprises:
 detecting, by a distance sensor, the absence of the user within the vicinity of the card sensor; and
 transmitting, by the distance sensor to the processor, a notification indicating the absence of the user within the vicinity of the card reader.

5. The method of claim 4, further comprising, prior to instructing the card reader to release the card, transmitting, by the distance sensor to processor, another notification indicating a presence of the user within the vicinity of the card reader.

6. The method of claim 1, further comprising recording, by a camera, the number of events in which the user has moved away from the card reader while the card was inserted in the card reader, the camera in data communication with the processor.

7. The method of claim 1, further comprising issuing, by a speaker, an audible notification when the user turns away from the card reader, the speaker in data communication with the processor.

8. The method of claim 1, further comprising detecting, by a camera, a presence of the user at the card reader, the camera in data communication with the processor and configured to observe the presence and movement of the user proximate to the card reader.

9. The method of claim 1, further comprising determining, by a camera, when the user moves away from the card reader, the camera in data communication with the processor.

10. A card reader comprising a processor, the processor configured to:
 determine that a card is inserted into the card reader;
 determine an absence of a user within a vicinity of the card reader;
 transmit, to a mobile device of the user, a first message including a first code and indicating the card has not been retrieved from the card reader;
 receive entry of the first code;
 transmit, to the mobile device of the user, a second message including a second code;
 receive entry of the second code; and
 instruct the card reader to release the card.

11. The card reader of claim 10, further comprising a slot configured for insertion and removal of a card.

12. The card reader of claim 10, further comprising a card sensor in data communication with the processor and configured to determine whether the card has been inserted into the card reader and whether the card has been removed from the card reader.

13. The card reader of claim 10, further comprising an input device in data communication with the processor, wherein the entry of the first and second codes are received through the input device.

14. The card reader of claim 10, further comprising a camera in data communication with the processor and configured to observe the presence and absence of the user in the vicinity of the card reader.

15. The card reader of claim 14, wherein the camera is further configured to monitor a movement of the user in the vicinity of the card reader, wherein the movement includes at least one selected from a group consisting of the user moving away from the card reader, the user inserting an item into a pocket, the user inserting an item into a bag, and the user operating a mobile device.

16. The card reader of claim 10, further comprising a distance sensor configured to detect a distance of the user from the card reader.

17. The card reader of claim 10, further comprising an output device in data communication with the processor and configured to present at least one of an audible notice or a visual notice to the user.

18. The card reader of claim 17, wherein the output device is a speaker.

19. The card reader of claim 10, further comprising a currency sensor configured to send a currency notification to the processor that a form of currency has been removed from the card reader.

20. A system for alerting a user of a card, comprising a card reader, wherein the card reader is configured to
 determine that the card is inserted into the card reader;
 determine an absence of the user within a vicinity of the card reader;
 transmit, to a mobile device of the user, a first message including a first code and indicating the card has not been retrieved from the card reader;
 receive entry of the first code;
 transmit to the mobile device of the user, a second message including a second code;
 receive entry of the second code; and
 instruct the card reader to release the card.

* * * * *